March 29, 1960 G. L. BOLLING ET AL 2,930,043
AUTOMATIC NAILING DEVICE
Filed Aug. 12, 1957 7 Sheets-Sheet 1

INVENTORS.
Glen L. Bolling
Walter D. Hodge
BY
Thos E Scofield
ATTORNEY.

March 29, 1960

G. L. BOLLING ET AL 2,930,043

AUTOMATIC NAILING DEVICE

Filed Aug. 12, 1957

INVENTORS.
Glen L. Bolling
Walter D. Hodge
BY
ATTORNEY.

March 29, 1960 G. L. BOLLING ET AL 2,930,043
AUTOMATIC NAILING DEVICE
Filed Aug. 12, 1957 7 Sheets-Sheet 6

INVENTORS.
Glen L. Bolling
Walter D. Hodge
BY
ATTORNEY.

United States Patent Office 2,930,043
Patented Mar. 29, 1960

2,930,043

AUTOMATIC NAILING DEVICE

Glen L. Bolling, Kansas City, Mo., and Walter D. Hodge, Kansas City, Kans., assignors to B & H Homes, Incorporated, Kansas City, Mo., a corporation of Missouri Application August 12, 1957, Serial No. 677,714

10 Claims. (Cl. 1—46)

This invention relates to mechanical nailing devices and refers more particularly to such a device wherein the nails are fed serially and mechanically from a magazine mounted on the nail driving mechanism or nailing head and wherein the means for applying force to the nail are attached to the driving head as well.

Time studies of carpenter work on certain types of rough nailing have clearly indicated the potential usefulness of mechanical nailers to improve the speed of the nailing process and lessen time lost to carpenter fatigue. The average speed of nailing as performed by a competent carpenter in such work is approximately one nail every five seconds. In nailing subflooring over joists, roughing in side wall sheeting over studdings (when the latter have been formed into a framework horizontally before erection of the side walls) and nailing roof sheeting over rafters such a speed causes a very great time loss compared to the potential time requirement of mechanical nailing devices.

A number of mechanical nailing devices have been heretofore produced and provided commercially, of which the compressed air operated nailers have been the best received by the building industry. However, the latter have been found to have a number of critical disadvantages which have prevented their wide and universal acceptance by the industry. One difficulty lies in the expensive air compressor required to operate these devices, the high cost of the compressor itself being additionally objectionable in view of the lack of need of the contractor for an air compressor in any of his related construction work. Another problem lies in the limited range of the nailing operator from the air compressor, due to the necessarily limited length of the plural tube bundle required which extends from the nail sorting device to the operating nailing head. Difficulties frequently are encountered with handling the bulky tube bundle around or over obstructions, corners and the like. Furthermore, the air compressor, all of the hose and tubing required, and the other associated equipment are cumbersome and difficult to transport to and from the job. Additionally, they require excessive storage space. Yet another objection all commercially available devices possess, lies in the fact that none offers a reliable nailing speed of over one nail per second.

Therefore, an object of the invention is to provide a mechanical nailing device operable to nail reliably at any desired rate up to three nails per second.

Another object of the invention is to provide a mechanical nailing device which is conveniently portable and has both a reasonable nail supply and nail driving means associated directly with it at the point of operation.

Another object of the invention is to provide a mechanical nailing device wherein the nail driving means preferably employed is an electric hammer, said hammer useable by the contractor in many other construction operations besides the mechanical nailing operation, the electrical hammer being readily and easily dissociated from the nailing device when it is desired to use it in any of these other operations.

Another object of the invention is to provide a mechanical nailing device which is relatively inexpensive to purchase and maintain in operation, especially compared to compressed air operated nailing devices.

Yet another object of the invention is to provide a mechanical nailing device which takes up a minimum space, is not cumbersome and is easily transportable to and from the job.

Another object of the invention is to provide a mechanical nailing device of relatively great simplicity, rugged construction and wherein all of the parts are readily accessible to repair, the device itself being easy to repair.

Still another object of the invention is to provide a mechanical nailing device which may be constructed, if desired, in various sizes to accommodate various sizes of nails without loss of efficiency or speed in operation.

Another object of the invention is to provide a mechanical nailing device which has a simple, positive acting feeding mechanism exceptionally free from the problems of jamming and able to feed nails continuously and at the desired speed at various angular positions of the nailing head.

Another object of the invention is to provide a mechanical nailing device which is able to nail at the desired operating speeds on a slope up to 30° from the horizontal and is able to nail roof sheeting at such angles.

Still another object of the invention is to provide a mechanical nailing device wherein the magazine containing the nails is easily and quickly loaded and reloaded and has a relatively large capacity, the magazine itself being constructable in various capacities, depending upon the capacity desired, without loss of efficiency and relatively little sacrifice in weight.

Another object of the invention is to provide a mechanical nailing device of the character described which may be easily and conveniently handled by a single workman of ordinary skill.

Still another object of the invention is to provide a mechanical nailing device which is preferably operated by an electric hammer, whereby movement of the nailing device relatively large distances from the source of power is possible or use of the nailing device without concern about passing the power line around obstacles, corners or sharp kinking of the power line.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Turning to the drawings, and Figs. 1–4 particularly, the inventive nailing device comprises a driving head which contains a vertically reciprocable driver or hammer element, a magazine for nails removably mounted on the side of the driving head and means operable with the magazine for moving nails serially from the magazine toward and into the driving head. For descriptive purposes the view of Fig. 1 will be designated a front view of the device vertically positioned and parts will be described in position and operation as to the right and left, forward and rearward, etc., relative Fig. 1.

Figures 1, 2, 13:
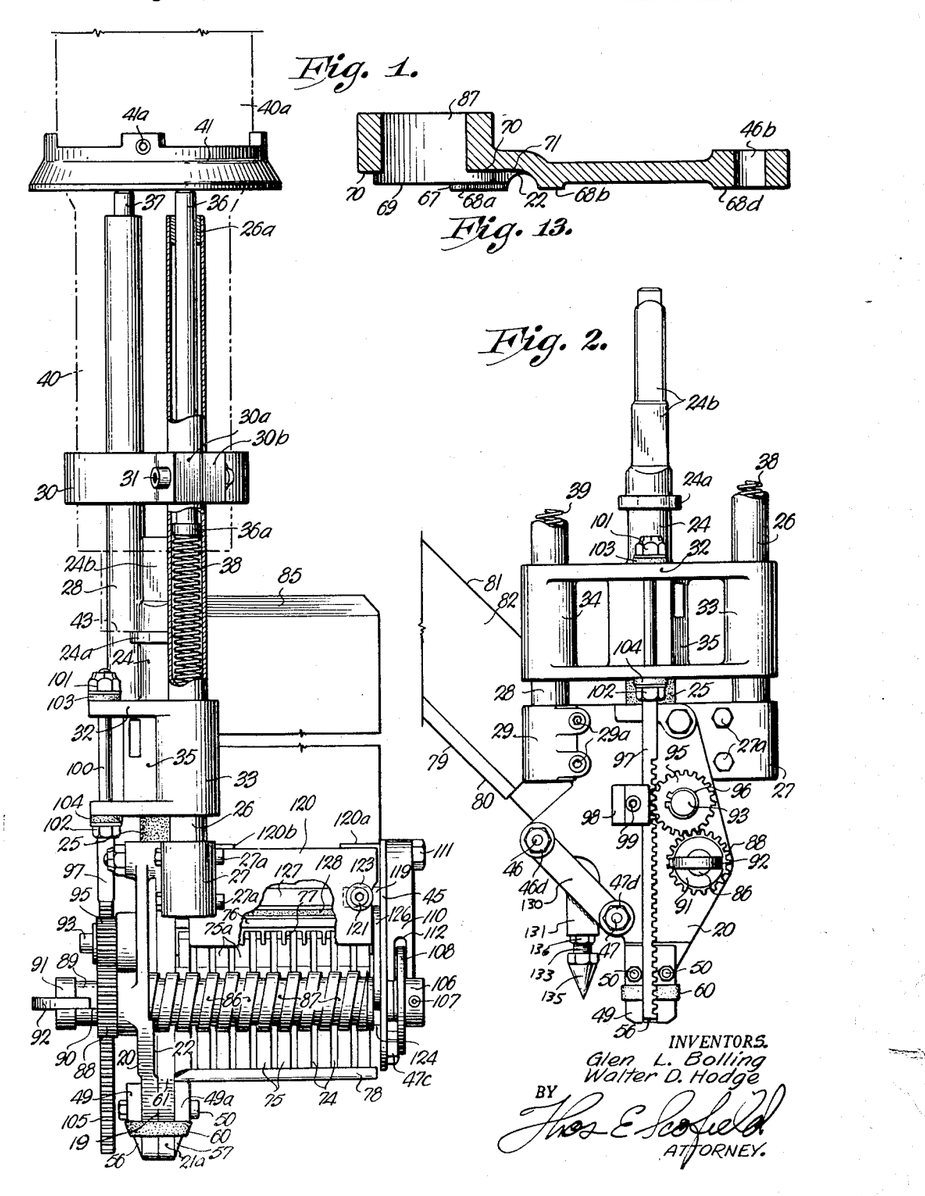
Fig. 1 is a front elevation of the inventive nailing device with parts cut away to better illustrate the construction and a portion of an electric hammer operable with the device shown in outline with broken lines engaged therewith.
Fig. 2 is a side elevation of the construction of Fig. 1 from the left-hand side of Fig. 1.
Fig. 13 is a view taken along the lines 13—13 of Fig. 9 in the direction of the arrows.
Figure 6:
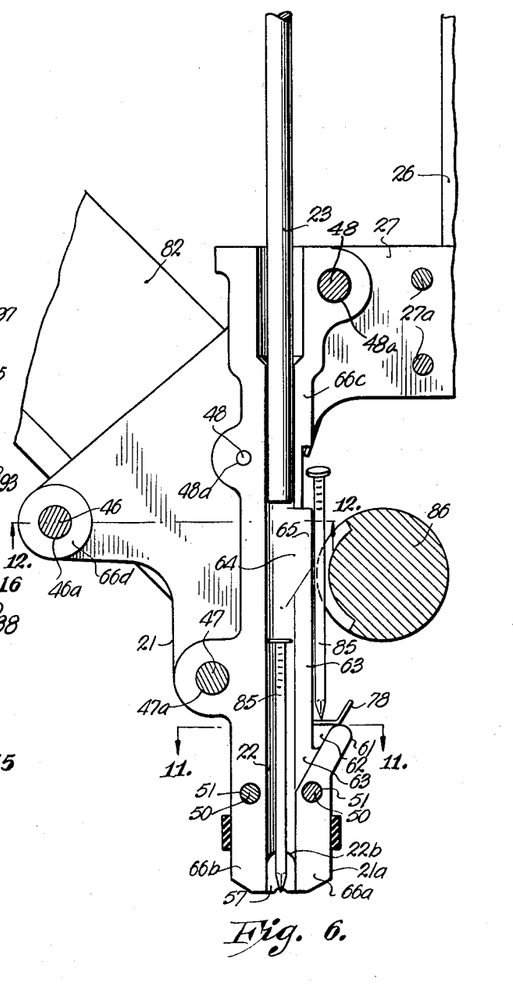
Fig. 6 is a view taken along the lines 6—6 of Figs. 4 and 5 in the direction of the arrows.
Figures 9, 10, 11:
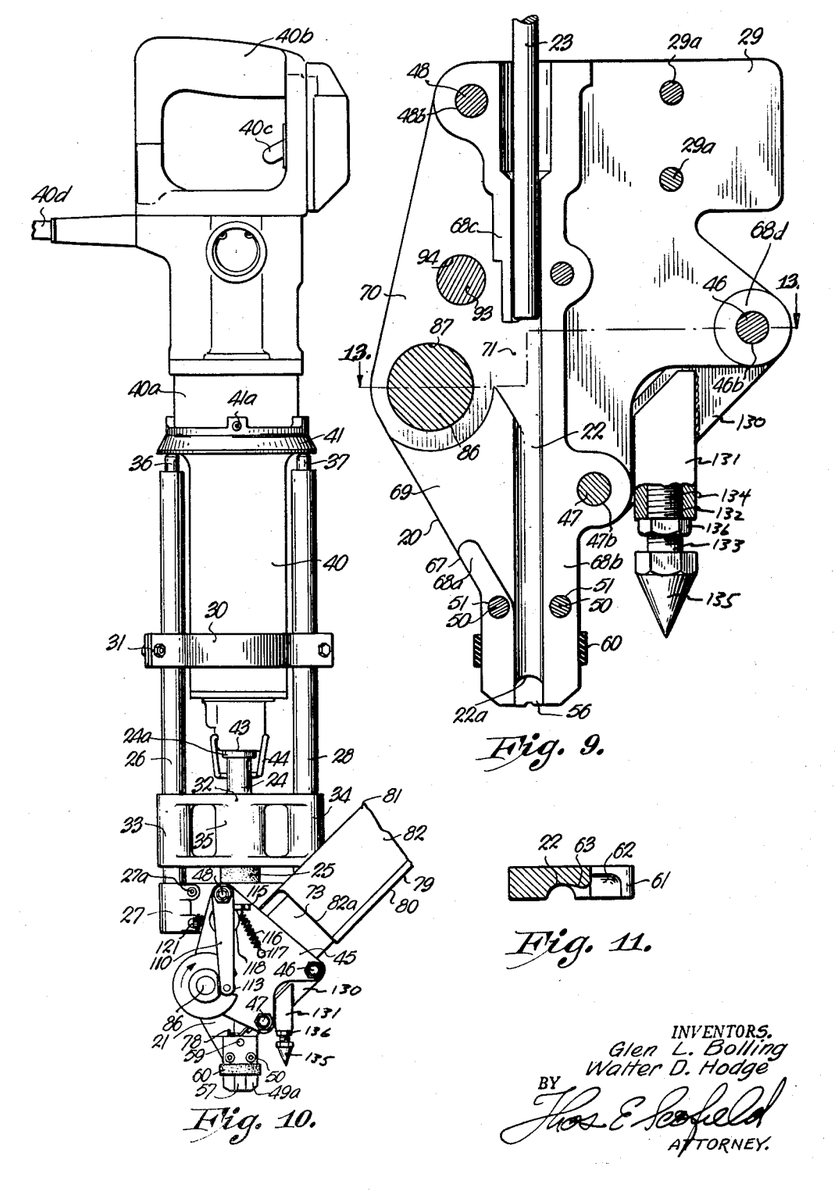
Fig. 9 is a view taken along the lines 9—9 of Fig. 5 in the direction of the arrows.
Fig. 10 is an overall view of the inventive nailing device with the driving hammer attached thereto taken from the right side of Fig. 1.
Fig. 11 is a view taken along the lines 11—11 of Fig. 6 in the direction of the arrows.

Referring then to Figs. 1, 6 and 9, the driving head 19 has left half 20 and right half 21. Fig. 6 shows the inside face of right half 21, while Fig. 9 shows the inside face of left half 20. Passage 22 runs longitudinally and vertically of the two halves of the driving head and receives driver 23 for reciprocating up and down movement therein. Driver 23 is securely held by a tapered socket in the lower end of upper driver portion 24 which is in turn permanently attached within the center portion 35 of yoke 32. Buffer 25, encircling the driver is interposed between the bottom surface of yoke 32 and the upper surfaces of the driving head halves 20 and 21 to limit the downward movement of driver 23 within the driving head.

Tube guide 26 is fixedly received in gripping member 27 on the right half 21 of the driving head while like tube guide 28 is received in like gripping member 29 on the left half 20 of the driving head. Bolts 27a and 29a fix the tube guides in their respective gripping members. Ring stop 30 is fixedly gripped on guides 26 and 28 by bolts 31 engaging split outer portions 30a and 30b. Yoke 32 has side elements 33 and 34 which slidably engage tube guides 26 and 28, respectively. Central member 35 of the yoke is fixed to the upper portion 24 of the driver 23 and controls the driver in the latter's vertical travel. The abutment of the upper surface of yoke 32 with the undersurface of stop 30 limits the upward travel of the driver relative the driving head. Push rods 36 and 37 are received in tube guides 26 and 28, respectively, and are resiliently forced upwardly by springs 38 and 39 which abut the lower ends of the push rods. Referring to Fig. 1, push rod 36 has enlarged lower end 36a, the upper portion of the rod being received in restricted opening 26a of the tube guide 26.

Figures 3, 4, 12:
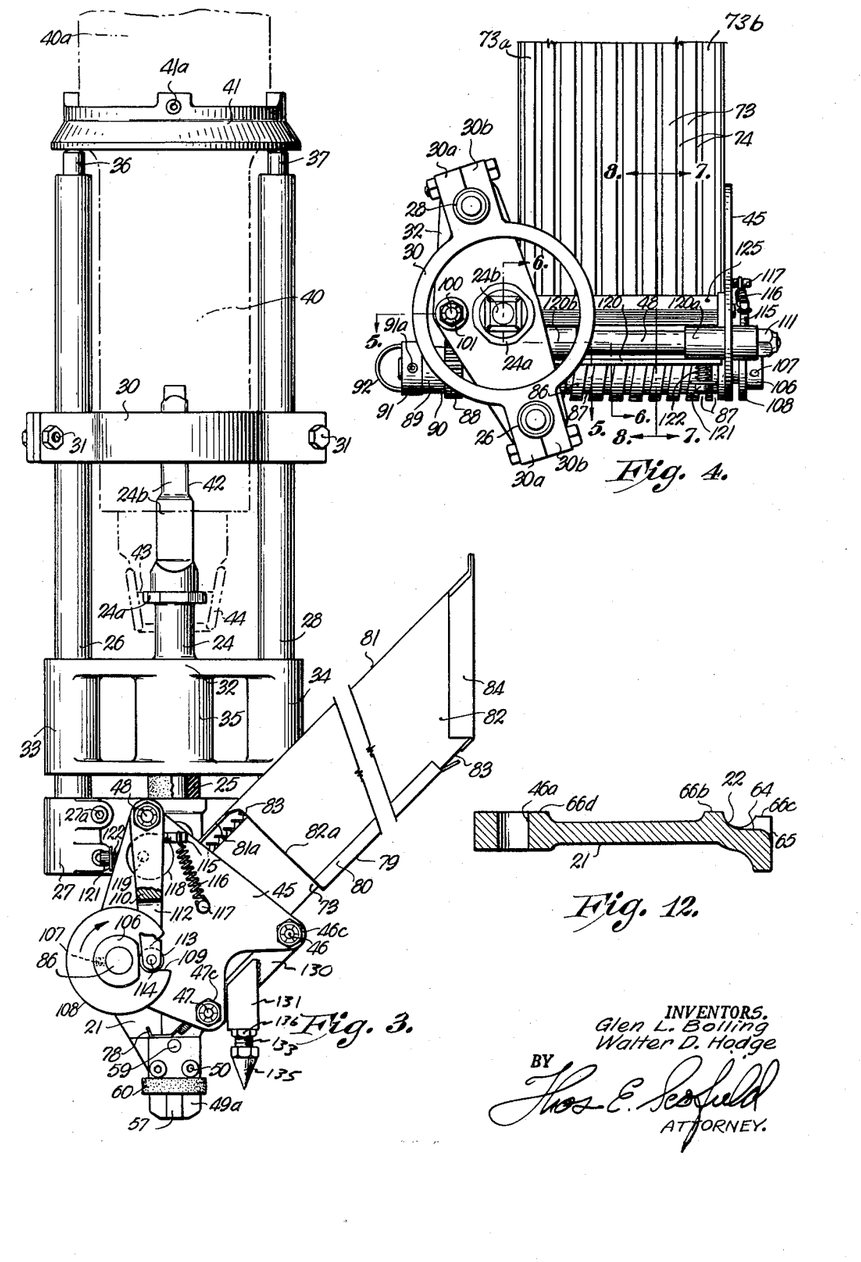
Fig. 3 is a side elevation of the device of Fig. 1 opposite to the showing of Fig. 2, that is, from the right-hand side of Fig. 1 with parts cut away and dotted in to better illustrate the relations of some of the parts, a portion of the operating hammer shown in outline with broken lines.
Fig. 4 is a top plan view of the inventive nailing device.
Fig. 12 is a view taken along the lines 12—12 of Fig. 6 in the direction of the arrows.

Fig. 10 shows an electric hammer of a preferred conventional type engaged with the inventive nailing device whereby to apply downward driving force to driver 23 after it has been lifted to its upper position. At 40 is indicated the lower end of the electric hammer, which may be fitted over and attached to the upper driver portion 24 as shown in Fig. 3 and will reciprocate upwardly and downwardly therewith relative the driving head, the tube guides 26 and 28 and the ring stop 30. Return ring 41 is attached to the body 40a of the hammer by screws 41a and receives against its lower surface the upper ends of the push rods 36 and 37. The upper portion 24 connected to the driver 23 has flange 24a thereon with upwardly extending engaging portion 24b thereabove. The electric hammer 40 has an internal passage 42 therein formed to receive the shaped portion 24b and, at its lower end has face 43 adapted to rest on and abut the upper surface of the flange portion 24a. Hinged snap lock 44 fastens the lower end 40 of the electric hammer to the upper portion 24 of the driver 23. The electric hammer shown in Fig. 10 also has grip 40b, switch 40c and power cable or cord 40d.

A typical suitable conventional electric hammer unit, as shown in Fig. 10 adaptable without change (save for the addition of return ring 41) for use with the inventive nailing device, is the Bosch installation hammer designated EW/UHD 75 or the Bosch builder's hammer EW/UHD 95, both manufactured by Robert Bosch G.m.b.H. of Stuttgart, Germany. It should be understood that the electric hammer represents only a piston element or the like attached to a power unit operable to exert downward force on the hammer upper portion 24 upon actuation of the electric hammer. Other power tools of conventional type could also be employed.

The upper driver portion 24 is raised until the yoke 32 abuts the underside of the ring stop 30 both by action of the push rods 36 and 37 acting upon the return ring 41 attached to the electric hammer and the operator grasping the grip 40b of the electric hammer and lifting it to move the assembled unit from one nailing position to another. The yoke 32 and the driver 23 are free to move vertically relative the driving head, the tube guides 26 and 28 and the ring stop 30 so, if the upper hammer portion 24b is received in the electric hammer opening 42 and portion 24 engaged by snap lock 44, the yoke 32 and the driver 23 will move upwardly relative the driving head and stop ring 30 easily, aided by the push rod action and the lifting force exerted by the user. The length of the push rods 36 and 37 is greater than the distance of travel of the driver 23 so that they will always remain in contact with the return ring 41 on the electric hammer body 40a.

Side plate 45 is spaced laterally out from the driving head right side 21 and is supported relative thereto by magazine support rods 46 and 47 and bracket support rod 48. Magazine support rods 46 and 47 pass through openings 46a and 47a in the right hand side of the driving head and openings 46b and 47b in the left hand side of the drive head. The portions of said magazine support rods 46 and 47 between the right hand face of the right hand side 21 of the driving head and the left hand face of the side plate 45 are enlarged and squared in cross section (Figs. 7, 8) whereby to rigidly position the plate 45 outwardly from the drive head. The bracket support rod 48 is received in through opening 48a in the right hand side of the drive head and opening 48b in the left hand side of the drive head. Like support rods 46 and 47, bracket support rod 48 is also enlarged to further make rigid the support of plate 45.

Figure 5:
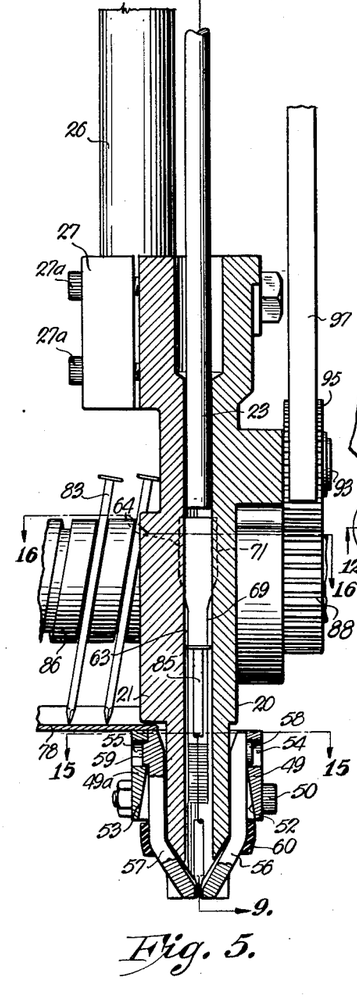
Fig. 5 is a view taken substantially along the lines 5—5 of Fig. 4 in the direction of the arrows.

The two halves of the driving head 20 and 21 have the lower end portions thereof hollowed out as at 22a and 22b in halves 20 and 21, respectively, opposite the passage 22. As shown in Fig. 5, lower side fittings 49 and 49a are removably fixed against the sides of driving head halves 20 and 21, respectively, by bolts 50 extending through openings 51 in the driving head halves. Recesses 52 and 53 and openings 54 and 55 are formed in the fittings 49 and 49a whereby to receive retainer jaws 56 and 57 therein which have studs 58 and 59 for engagement with the openings 54 and 55. A band 60 of resilient material such as rubber is employed to urge the lower ends of the retaining jaws 56 and 57 together. Band 60 normally maintains the lower ends of the jaws 56 and 57 so closely together as to prevent a nail falling out of the passage 22 in the driving head halves. However, force applied to the top of a nail by the driver 23 can push it, against the action of the resilient band 60, out through the retainer jaws 56 and 57, when they again snap back to their contracted position. The slanted recessed portions 52 and 53 permit the pivotal movement of the jaws 56 and 57 relative the side elements 49 and 49a and studs 58 and 59 must not too tightly fit in the openings 54 and 55 to prevent such pivotal movement.

Referring to Fig. 6, wherein is shown the left or inside face of the right hand half 21 of the driving head, and Fig. 11, which is a sectional view through said half 21 immediately above its lower end, lip 61 extends outwardly and forwardly past the lower front face 21a of half 21 and has tapered lateral recess 62 formed therebehind leading inwardly toward passage 22. The portion of the inside face of driving head half 21 between lip 61 and passage 22 is also laterally recessed as in the case of recess 63 but only to a depth approximately equal to the depth of the passage 22.

Fig. 12 is a section through half 21 above the section of Fig. 11. Upwards of the recessed portion 63, the portion 64 of the half 21 forward of the passage 22 is recessed laterally to a depth only very slightly greater than the depth of the passage 22. The laterally recessed portion 64 has a depth beginning centrally of the passage equal to the greatest depth of the passage, which depth then forwardly is increased slightly approaching the front edge of half 21. From thence forwardly, the portion 64 curves sharply laterally as at 65 to the right. This construction will be described functionwise later. Inside face portions 66a, 66b, 66c and 66d are all flush with one another.

Referring now to Fig. 9 and the inside view of half 20, forward lip portion 67 has its inside surface 68a flush with flat surface 68b of the driving head half 20 rearward of the passage 22 and flat surface 68c above it and forward of passage 22. Surfaces 68a, b, c and d are adapted to lie flush against the surfaces 66a, b, c and d (Fig. 6). Fig. 13 is a section through half 20 and shows the relative depths of some of its laterally recessed portions. The innerface 69 of the driving head half 20 above lip 67 and forward of passage 22 is laterally recessed to the left but not to the depth of the passage 22. The inner face portion 70 is recessed to a greater depth than passage 22 and portion 69 and blends in its limited rearward extremity 71 (which matches portion 64 when halves 20 and 21 abut) with passage 22.

Figure 7:
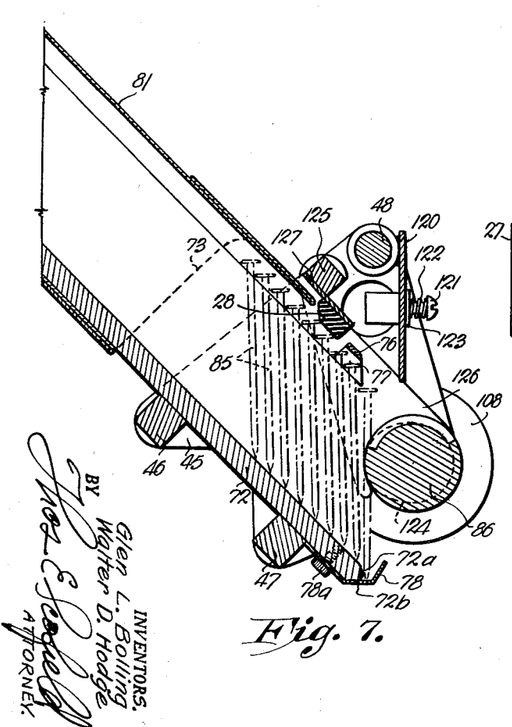
Fig. 7 is a view taken along the lines 7—7 of Fig. 4 in the direction of the arrows.
Figure 8:
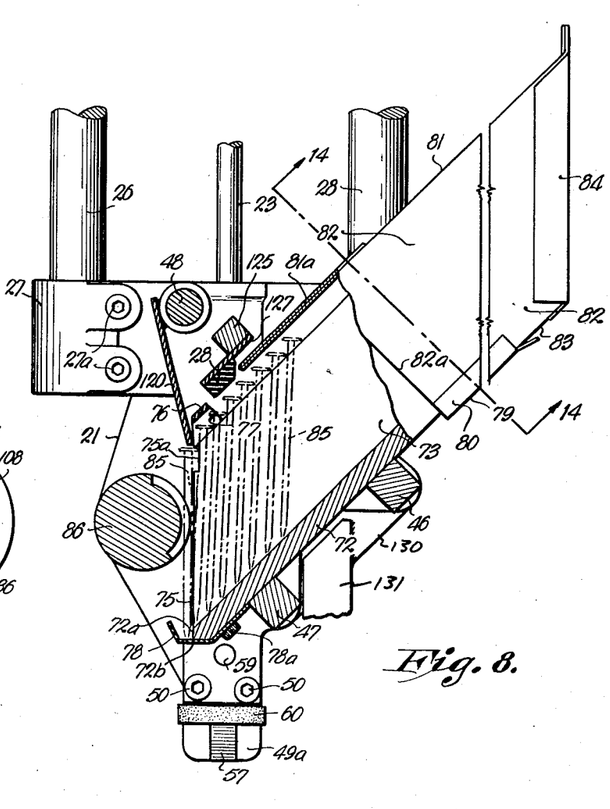
Fig. 8 is a view taken along the lines 8—8 of Fig. 4 in the direction of the arrows.
Figure 14:
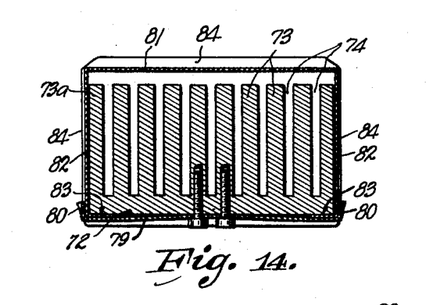
Fig. 14 is a view taken along the lines 14—14 of Fig. 8 in the direction of the arrows.
Figure 15:
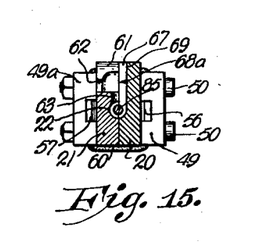
Fig. 15 is a cross sectional view through the driving head taken along the lines 15—15 of Fig. 5 in the direction of the arrows.

Turning now to the construction of the magazine, best seen in Figs. 3, 7 and 8, bottom plate 72 is preferably solid and has its front edge beveled in meeting faces 72a and 72b, as seen in Figs. 7 and 8. A plurality of divider plates 73 are fixed at right angles to the bottom plate 72 parallel to one another and spaced therefrom to form a plurality of nail receiving channels 74 (Figs. 1 and 4). The numeral 73a (Figs. 4 and 14) indicates the innermost divider plate of the magazine next the driving head, while the numeral 73b indicates the peripheral or outermost divider plate spaced outwardly from the nailing head. The thickness of the plates 73 is preferably at least equal to the diameter of the nail body of the size and type of nail to be employed in the driving device. The front faces 75 of the plates 73 are vertically aligned with the front edge 72a of the bottom plate 72 (Fig. 8). The upper front faces of the plates 73 are cut away as at 75a to allow for the width of the nail heads as may be seen in Figs. 7 and 8. A roof or hood portion 76 is fixed to each of the plates 73 by downwardly extending portions 77, thus forming a cover over the forward end of each channel 74 under which the heads of the nails must pass. Roof 76 prevents the nails rising beyond a certain point vertically relative the magazine when they approach the feed end thereof. Trough 78 is removably fastened to the forward underside of the bottom plate 72 by bolts 78a and ordinarily must be applied to the plate 72 of the magazine after it has been inserted with its forward end past the forward guide bar 47. The lateral extension of trough 78 next the drive head half 21 is seen in Fig. 5.

As may be seen from Figs. 7 and 8 the upper surfaces of the guide bars 46 and 47 are flat and angled to precisely position the magazine relative the driving head. There must be a very slight clearance between the front face of the magazine and the spiral worm shaft outer surface (to be described). Therefore, the bottom plate 72 of the magazine is accurately drilled and tapped to receive screws through bars 46 and 47 and thereby maintain proper location of the magazine. The trough 78 is so formed as to abut the undersurface thereof with the upper surface of side fitting 49a and thus also aid in positioning the magazine precisely. The rear edge of the trough 78 is so positioned as to abut the front flat face of the square rod portion 46, as in Figs. 7 and 8, to further aid in such positioning.

Magazine bottom cover guide 79 is fixed to the undersurface of magazine bottom plate 72 with its outer edge portions also under the plate 72 and spaced downwardly away therefrom. Upwardly turned side flange portions 80 are spaced laterally from the outer plates 73a and 73b (Fig. 4) of the magazine. The magazine has slide cover 81 with downwardly extending sides 82 so formed as to fit within the spaced flanges 80 and also turned under edge portions 83 which will fit between the magazine bottom cover guide 79 and the bottom plate 72 of the magazine. The top plate of the magazine slide-on cover extends forward further as at 81a than the front edges 82a of side plates 82 but the top cover stops short of the roof 76 by sufficient distance to give clearance for the second flapper (to be described). The top cover of the magazine has sufficient clearance over the tops of the plates 73 to allow for the tilting of the nail heads, which relationship may be seen in Figs. 7 and 8. Cover 81 also has back plate 84 to prevent any of the nails 85 from falling out the rear of the magazine when the slide-on cover is positioned thereon, should the nailing device be tilted over rearwardly a greater angle than the angle of the magazine from the axis of the passage in the driving head. The angle of the magazine relative said passage when mounted in the device is preferably approximately 45° to provide a sufficient angle for feeding the nails by gravity within the magazine when the hammer is in operation in a nominally vertical position and yet permit orderly feeding without excessive weight and force exerted by the nails on one another.

Worm shaft 86 is received in and extends through opening 87 in the left hand half 20 of the driving head and is received in and extends through an opening (not shown) in side plate 45 whereby to rotate relative both the driving head and the side plate. The central portion of the worm shaft 86 is enlarged between the plate 45 and the left half 21 of the driving head and has worm channel 87 continuously formed in the outside surface thereof extending as a continuous channel from past the right hand peripheral nail holding channel 74 in the magazine on the right hand side of the nailing device to past the lip 67 on the left half 20 of the driving head. As previously mentioned, a very slight clearance is maintained between the outer surface of the shaft 86 and the front faces 75 of the magazine plates 73 but not a clearance equal to the diameter of a nail shaft.

Figure 16:
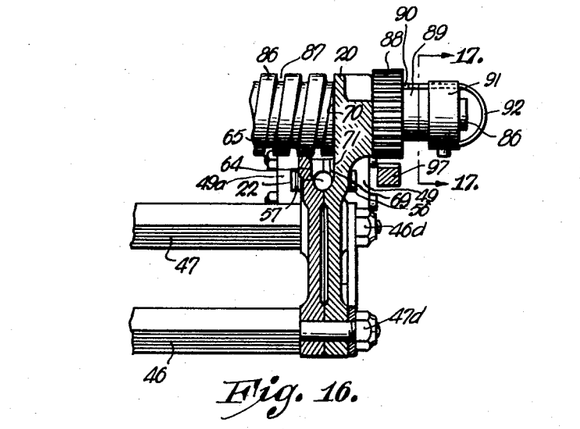
Fig. 16 is a cross sectional view of the driving head taken along the lines 16—16 of Fig. 5 in the direction of the arrows.
Figure 17:
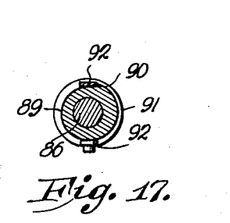
Fig. 17 is a view taken along the lines 17—17 of Fig. 16 in the direction of the arrows.
Figure 18:
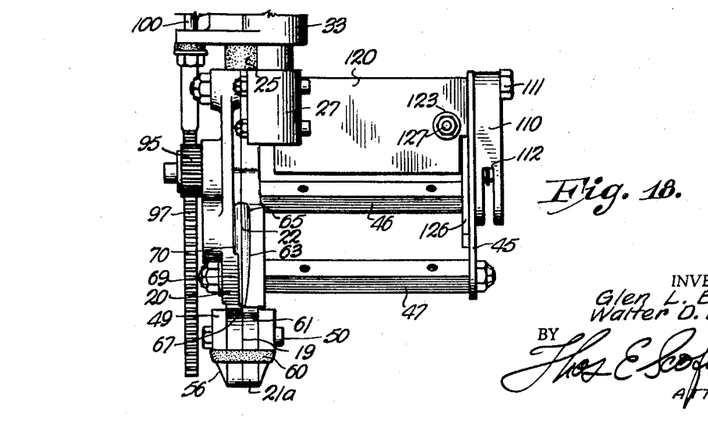
Fig. 18 is a partial frontal view of the inventive nailing device exactly as in Fig. 1 with the exception that the worm shaft and magazine have been removed from the apparatus.
Figures 19, 20:
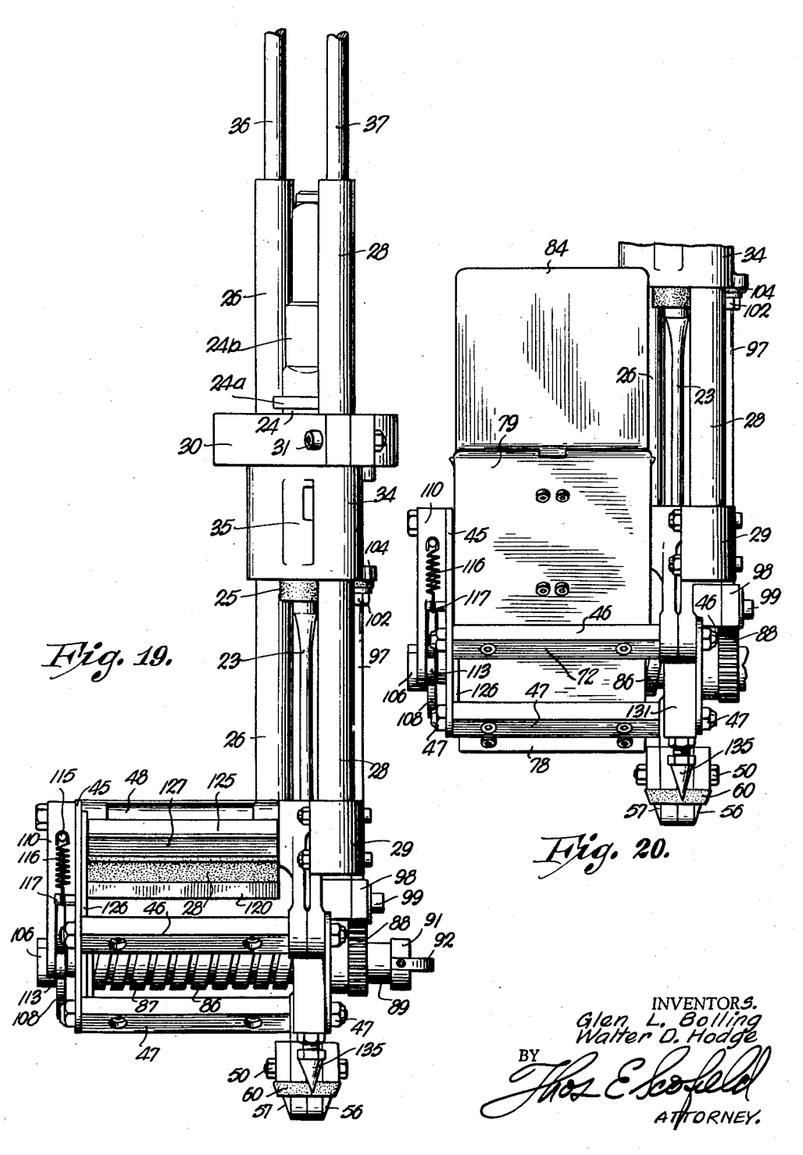
Fig. 19 is a rear view of the inventive nailing device with the magazine removed therefrom. This view is 180° opposite to the view of Fig. 1.
Fig. 20 is a view of the lower portion of the nailing device exactly as in the view of Fig. 19 but with the magazine inserted in the device.

Pinion gear 88, Fig. 16, has hub 89 with shoulder 90 thereon fixed thereto and both these members are rotatably and slidably mounted on the portion of the shaft 86 which extends through the left half 20 of the driving head. Hub 89, Fig. 17, is actually a cam sleeve. End collar 91 is fixed to the shaft 86 by screw 91a and has horseshoe spring 92 fixed at its short end to the collar 91 and its long end held circumferentially relative collar 91 by a slot but which leaves it free to move radially and engage the cam sleeve 89, ride over the surface thereof and engage the shoulder 90. Idler shaft 93 is received fixedly in opening 94 extending through the left half 20 of the driving head and rotatably mounts idler gear 95 which engages pinion gear 88. Spring keeper 96 engages a groove (not shown) on shaft 93 to maintain idler 95 in position thereon. Rack 97 engages idler gear 95 and is retained in engagement therewith by rack guide 98 bolted to the left half 20 of the driving head by bolt 99 which is received in opening (not shown) in the left half 20 of the driving head. Rack adjustment rod 100 is the upper portion of rack 97 and is adjustably bolted relative yoke 32 by nuts 101 and 102 engaging threaded portions (not shown) of the rod 100 and spaced relative the upper and lower faces of the yoke 32 by shims and packings 103 and 104. The length of the toothed portion of the rack and number of teeth 105 thereon must be sufficient to cause a 360° rotation of the worm shaft 86 on movement of the rack 97 from its lowermost position shown in Figs. 1 and 2 to its uppermost position. These positions are defined by abutment of the yoke 32 with the ring stop 30 and the top of the driving head, buffer 25 actually moving with yoke 32 and being the surface contacting the top of the driving head.

The engagement between cam sleeve 89, Fig. 17, and horseshoe spring 92 acts as a clutch which causes rotation of the worm shaft 86 only when the rack 97 moves from its lowermost to its uppermost position. Thus, the rack moving upwardly in Fig. 2 rotates the idler gear 95 in a clockwise direction which, in turn, rotates pinion gear 88 in a counterclockwise direction. The shelf 90 on sleeve 89 engages horseshoe spring 92, thus causing end collar 91 and shaft 86, which is fixed thereto, to rotate in a counterclockwise direction in Fig. 2 or from the bottom to the top in Fig. 1. On return of the rack 97 downwardly, the idler gear 95 is rotated in a counterclockwise direction which rotates the pinion gear 88 in a clockwise direction but this merely permits the cam sleeve 89 to slide under the horseshoe spring 92 which then falls over the shelf 90 ready for reengagement therewith upon upward motion of the yoke 32.

The width of the channel 87 on the peripheral surface of the shaft 86, that is, the distance between similar points in the channel 360° apart, must be equal to the spacing, centerline to centerline, of the magazine channels 74 whereby a single 360° rotation of the shaft 86 will move a nail picked up from one channel of the magazine a distance laterally equal to the distance between magazine channels 74. It should be noted that the worm channel 87 has portions thereof spaced opposite all of the magazine channels 74 for feeding of nails thereinto when the shaft 86 is at the beginning of its rotation stroke as in Fig. 1. After only a partial rotation of the worm shaft 86, the worm channel portions next the magazine feed face are out of registration with the channels 74 and return to said registration at the completion of the 360° rotation.

Referring now to the right hand end of the shaft 86 which extends past the side plate 45 and more particularly Figs. 1 and 3, end collar 106 is fixed to the end of shaft 86 by screw 107 and has cam 108 fixed thereto. Cam 108 has recess 109 formed therein. Arm 110 is free to rotate at its upper end about a sleeve placed over shaft 48 and is bolted thereon by nut 111. The sleeve (not shown) permits nut 111 to place clamping pressure against plate 45 through arm 110. The lower portion of arm 110 is yoked as at 112 (Fig. 1) and roller 113 is pivoted and rotatably mounted on shaft 114 extending between the divided lower arms 112 of arm 110. The roller 113 fits in cam recess 109 when the rack 97 is in its lowermost position with the worm shaft 86 at its start position relative the nail channels in the magazine. Grooved pin 115 is press fitted into the upper rearward face of arm 110. Resilient coil spring 116 engages the groove of pin 115 with its free end and similar pin 117, which is riveted into plate 45, with its other, so as to tend to rotate arm 110 in a clockwise direction around shaft 48 in the view of Fig. 3. Thus roller 113 tends to stay in contact with the outer surface of cam 108.

An enlarged opening 118 is formed in the side plate 45 adjacent the upper end of arm 110. A stub shaft 119 is fixed to the left side of arm 110 and extends through said opening 118. Front catch plate or flapper 120 is fixed to sleeves 120a and 120b which are pivotally mounted on shaft 48. Referring to Figs. 4 and 7, screw 121 having an enlarged head extends through an opening (not shown) in flapper 120 and threadedly engages stub shaft 119. Spring 122 engages with its front end the rear side of the enlarged head 121 and, with its rearward end, plate 123 which has an opening (not shown) through which the shaft of screw 121 extends and which is freely mounted on the shaft of the screw 121 but normally abuts against the front face of the flapper 120 under the action of the spring 122. Thus, the flapper 120 is free to rotate around shaft 48 forwardly and rearwardly except for its rearward abutment against the stub shaft 119 and the resilience of the spring 122 acting against its forward movement.

The action of the cam 108 on the arm 110 and the flapper 120 will now be described. When the rack 97 is in its lowermost position, as in Figs. 1–4, the roller 113 is positioned within the recess 109 of the cam 108. Referring to Fig. 3, clockwise rotation of the cam 108 (as the rack 97 moves upwardly and rotates the shaft 86 in a clockwise direction in Fig. 3) will force the roller out of the recess 109, thus moving the lower end of arm 110 to the right in Fig. 3 and also moving the stub shaft 119 to the right in this figure. The position of the flapper 120 before rotation of the cam 108 is shown in Fig. 7 in a position equivalent to the showing of Fig. 3. Fig. 8 shows the flapper 120 in its rearward position which is maintained by all of the outer surface of the cam 108 except the recess 109. In the rearward position, the lower end of the flapper 120 pushes back the first row of nails in the magazine not actually received in the worm channel 87 whereby to avoid any interference by them with the nails in the channel as the latter move laterally across the face of the magazine. The hood 76 prevents excessive upward movement of the nails. Thus, during essentially the entire rotation of the worm shaft 86, the flapper 120 is in its rearward position, as shown in Fig. 8, keeping the magazine nails out of interference with the nails in the worm channel which are being moved laterally toward the driving head.

Referring now to Figs. 1 and 7, portion 124 of the worm shaft 86 immediately short of the side plate 45 is formed eccentric. The character of this eccentricity is indicated by the dotted lines in Fig. 7. A shaft 125 is pivotally received at its right end in the side plate 45 and at its left end in the right hand side 21 of the driving head. Yoke arm 126 is rigidly fixed at its upper end thereto and with its lower end partially encircles the eccentric portion 124 of the shaft 86. The eccentric 124 is so formed on shaft 86 that, after the rotation of worm shaft 86 has commenced in a counterclockwise direction in Fig. 7 and the front flapper 120 has been retracted to hold back the nails contained within the magazine, the portion of the eccentric 124 of greatest eccentricity acts so as to move the arm 126 slightly in a counterclockwise direction in Fig. 7 around shaft 125 (or to the right in that view). This moves second flapper 127, which has resilient buffer of rubber or the like 128 on the underside thereof, away from and free of the heads of the nails 85 so that the weight of the columns of nails in the magazine channels 74 fall fully against the first flapper. Continuing the rotation of the shaft 86, the eccentric portion 124 of the shaft 86 then acts so as to return the arm 126 in a counterclockwise direction in Fig. 7 around shaft 125 (or to the left in the figure) before the completion of the 360° rotation of the shaft 86 and before the roller 113 on arm 110 falls back into the recess 109. Thus the second flapper 127 and its rubber buffer 128 are engaged with the heads of the nails before the first flapper releases them and returns to its position in Fig. 7. The second flapper 127 and its buffer 128 are so spaced relative the end of the magazine that the buffer 128 will engage the heads of the third row of nails 85 in the channels 74 within the magazine. The position of the second flapper 127 may be adjusted toward or away from hood 76 so as to engage any nail in the sequence but the arrangement shown is preferable. The action of the second flapper 127 thus is "within" the action of the first flapper 120, that is, with the very commencement of the rotation of the shaft 86, the first flapper 120 engages the columns of nails 85 and holds them back relative the worm channel 87 of the worm shaft 86. After this engagement occurs, the second flapper 127 releases the nails above it in the magazines and lets the full weights of the columns of nails fall against the first flapper. Additionally, any gaps in the nail rows between the flappers are filled at this time. Then, before the first flapper again releases the columns of nails, the second flapper reengages the columns of nails rearwardly of the first flapper.

Arm 130 is attached to the left hand side 20 of the driving head by engagement with bolts 46 and 47. Socket member 131 is welded to the right hand face of arm 130 and has threaded socket 132 (Fig. 9) extending upwardly thereinto. Roof engaging member 133 has threaded upper end 134 and pointed lower end 135. Threaded portion 134 engages threaded socket 132 for vertical adjustment of the position of pointed end 135 with nut 136 fixing such adjustment when made. Member 133 is employed when nailing on inclines or roofs and prevents slipping of the nailing unit. The angle of the nailing incline determines the desired vertical position of point 135.

In beginning the description of the operation of the inventive nailing device, it is assumed that an electric hammer of the sort shown in Fig. 10 has been engaged with the hammer portion 24b with the push rods 36 and 37 abutting the return ring 41 attached to the hammer. The mechanism is in the position shown in Figs. 1–4 with the driver down, the rack 97 down and the worm shaft 86 at the beginning of its stroke with the worm channel 87 open opposite channels 74 as shown in Fig. 1. The roller 113 is in the recess 109 of cam 108. If the magazine is not loaded with nails the cover of the magazine may be taken off and nails fed into the channels manually, or, mechanical sorters for the nails may be provided which attach to the nailing device itself while transferring sorted or oriented nails from the sorter to the magazine.

Nails fed into the magazine when the mechanism is at the bottom position of Figs. 1–4 will be stopped by second flapper 127 in its Fig. 7 position. The operator then raises the electric hammer upwardly by grasping the grip thereof. As the electric hammer is fixed only to the upper portion 24b of the driver 23 of the nailing device, the electric hammer and driver 23 of the nailing device move upwardly, urged by the push rods 36, while the nailing device itself remains stationary relative vertical motion. The yoke 32, being attached to the driver and slidably mounted on the tubes 26 and 28, moves upwardly, carrying the rack 97 therewith. The upward motion of the electric hammer, the driver 23, the yoke 32 and the rack 97 are limited only by the contact of the upper face of the yoke 32 with the stop ring 30 fixed on the tube guides 26 and 28.

The upward movement of the rack 97 causes the following sequences of action. Idler gear 95, engaged with the rack 97, rotates from top to bottom in Fig. 1 and clockwise in Fig. 2. Pinion gear and cam sleeve 89, the former engaged with idler 95, rotate from bottom to top in Fig. 1 and counterclockwise in Fig. 2. The cam shelf 90 abuts the spring 92, thus rotating the collar 91 and the shaft 86 attached thereto. The rotation of shaft 86 cams arm 110 to the right in Fig. 3 and moves flapper 120 to the position shown in Fig. 8. Flapper 127 then lifts and releases the nail rows in channels 74 which pass downwardly and forwardly to abut the rear face of flapper 120. When the yoke 32 abuts the underside of ring 30, roller 113 returns into recess 109 in cam 108 and flapper 120 releases so the front nails fall out into the worm channel portions which are then opposite the magazine channels 74. The bottom ends of the nails in the worm abut trough 78. The return of yoke 32 to the Figs. 1–4 position has no effect on shaft 86 due to the clutch thereon. No nail being in the driving head, there is none driven by the downward movement of driver 23 in passage 22.

Upon again raising for a second time the electric hammer and thus raising the driver 23 and the rack 97, the rotation of the worm shaft 86 is accomplished in the manner described previously with the resultant actions in the coordinated parts of the nailing device. In this case, however, the nails already charged into the worm channel 87 are moved a full space to the left toward the driving head, that is, a distance equal to the distance between the centers of two adjacent magazine channels 74. As the flapper 120 holds the second row of nails back during the entire rotation and the nails charged into the worm channel 87 move one space to the left, the worm channel portion at the extreme right opposite the far right magazine channel, at the end of the 360° turn of the shaft 86 is empty. Since there were no gaps in the rows of nails between the two flappers when the second flapper raises, after the first flapper moves rearwardly, no nails pass downwardly into the space between the two flappers. Again, no nail is driven on the second return of the hammer element downwardly as there is a distance the equivalent of two spaces from the leftmost magazine channel 74 into the passage 22 in the driving head. The electric hammer in the second return, as in the first, is not switched on.

Coming to the third raising of the upper driver portion 24 by the operator raising the electric hammer, it should be noted that, when the yoke 32 was at the top portion of its vertical movement in the second raising, and the flapper 120 moved out to its position in Fig. 7 (after the roller 113 returned into the recess 109 in cam 108) a nail falls forwardly out of the right hand channel 74 in the magazine into the right hand vacant portion in the worm channel 87, thus leaving merely one nail between the outer surface of the worm channel and the second flapper, which is holding back the nail rows thereabove. There is thus a gap available for filling in the right hand channel 74 when the second flapper again raises. The raising of the yoke 32, driver 23 and rack 97 with the electric hammer in the third lift by the operator passes a nail from the left end worm channel 87 into passage 22 in the driving head.

The point of this nail, as it is moved to the left by the rotation of the worm shaft 86, falls into the recess 62 behind the lip 61 of the right half of the driving head.

The approach of the nail in the trough 78 guided by the worm channel may clearly be seen in Fig. 6. Once the point of the nail passes into the recess 62, it is guided by the taper therein both to the left and rearwardly to pass down the angled rearward faces of the lips 61 and 67 toward the passage 22. This downward free fall (the nail is free to slide downwardly, still engaged within the worm channel) permits the enlarged head of the nail to fall downwardly and enter into the enlarged opening provided by portions 65, 70, 64 and 71 in the driving head halves 20 and 21 into the passageway 22. Once the nail is within the passageway 22, it falls downwardly to the position illustrated in Fig. 5 where the gripping elements 56 and 57 prevent further downward motion thereof.

The upward movement of the driver and rotation of the shaft 86 therewith in the third lift again cams back the front flapper 120 to hold the front row of nails in the magazine free of the worm channel 87. The rotation of the channel 87 again moves the nails therein one space to the right and creates the vacancy in the right hand worm channel portion when the 360° rotation is completed. In the meantime, the raising of the second flapper during the lifting of the driver 23 in its third raise permits the nails in the right hand channel 74 to fill the gap between the two flappers. The return of the flapper 120 to its Fig. 7 position at the end of the 360° rotation of the shaft 86 permits a nail from the right hand channel 74 to fall into the gap in the right hand portion of the worm shaft channel. This again leaves a single nail gap between the two flappers in this channel.

The return of the driver downwardly in its stroke this time is with the electric hammer switched on and applying its force to the upper driver portion 24. The lower driver portion 23 contained within the driving head exerts sufficient force on the nail 85 within the driving head to force it past the resiliency engaged locking elements 56 and 57 and into the surface to be nailed supporting the bottom end of the driving head.

The lifting of the electric hammer in the fourth raise by the operator to move the nailing device to another nailing position charges another nail into the driving head in the manner described, rotates shaft 86, manipulates the flappers, passes nails down the channel from which the nails are feeding at the right hand side of the nailing device and, again, charges the empty gap in the worm channel at the end of the upward stroke. It should be pointed out that, so long as any nails remain in the right hand channel of the magazine, nails will be fed only from this channel. When the nails are exhausted from this particular channel, the nails then feed from the second channel from the right as this is the only channel having nails therein which has a vacant gap in the worm channel before it at the end of an upward lifting stroke. The number of nails driven per second depends only upon the speed of the operator in lifting the electric hammer and transferring the nailing device to its next position for nailing and the time in the nailing stroke, which itself is practically instantaneous. When all of the channels have been exhausted, the cover of the magazine may be removed and nails manually or semi-automatically charged to the magazine. A typical magazine capacity for use with the nailing device is 300 nails. We have discovered that an ordinary workman can nail this charge of nails without undue fatigue and the break to recharge gives a rest period.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

Inasmuch as various possible embodiments may be made of the invention without departing from the scope thereof, it is to be understood that all matter hereinabove set forth or shown in the accompanying drawings is to be interpreted as illustrative and not in a limiting sense.

Having thus described our invention, we claim:

1. A mechanical nailing device comprising a driving head, a passage within said driving head, a nail receiving magazine having its feed end extending laterally from one side of said driving head, a plurality of nail positioning channels within said magazine opening out of the feed end thereof, each channel adapted to receive and position in serial feeding order a plurality of nails, a worm shaft rotatably mounted on said driving head, extending substantially parallel to said feed end of said magazine and being spaced therefrom a distance less than the diameter of the shank of a fed nail, an opening in the driving head to give access for nails serially into the passage therein adjacent the inner side of the magazine, the worm shaft extending beyond said magazine feed end to a position adjacent said opening, the distance between adjacent portions of the worm shaft 360° away from one another equal to the distance between adjacent magazine nail receiving channels, and means for rotating the worm shaft one complete revolution for each operation of said device.

2. A mechanical nailing device comprising a driving head, a passage within said driving head, a nail receiving magazine having its feed end extending laterally from one side of said driving head, at least one nail positioning channel within said magazine opening out of the feed end thereof, said channel adapted to receive and position in serially feeding order a plurality of nails, a worm shaft rotatably mounted on said driving head, extending substantially parallel to said feed end of said magazine and being spaced therefrom a distance less than the diameter of the shank of a fed nail, an opening in the driving head to give access for nails serially into the passage therein adjacent the inner side of the magazine, the worm shaft extending beyond said magazine feed end to a position adjacent said opening, and means for rotating the worm shaft one complete revolution for each operation of said device.

3. A mechanical nailing device as in claim 2 including nail guide means positioned below the feed end of the magazine and the side of the worm shaft next said feed end and between the latter and the worm shaft.

4. In a mechanical nailing device, a driving head, a passage within said driving head to receive nails serially, a nail receiving magazine having its feed end extending laterally from one side of said driving head at least one nail positioning channel within said magazine opening out of the feed end thereof, said channel adapted to receive and position in serial feeding order a plurality of nails, a worm shaft rotatably mounted on said driving head, extending substantially parallel to said feed end of said magazine and being spaced therefrom a distance less than the diameter of the shank of a fed nail, an opening in the driving head to give access for nails serially into the passage therein adjacent the inner side of the magazine, the worm shaft extending beyond said magazine feed end to a position adjacent said opening, means for rotating said worm shaft one complete revolution for each operation of said device, and means for retaining nails within said magazine channel which are not actually engaged by said worm shaft while said worm shaft is turning.

5. A device as in claim 4 wherein the means for retaining the nails not engaged in the worm shaft is operated from the worm shaft.

6. In a mechanical nailing device, a driving head, a passage within said driving head to receive nails serially, a nail receiving magazine having its feed end extending laterally from one side of said driving head, at least one nail positioning channel within said magazine opening out of the feed end thereof, said channel adapted to receive and position in serial feeding order a plurality of nails, a worm shaft rotatably mounted on said driving head, extending substantially parallel to said feed end of said magazine and being spaced therefrom a distance less than the diameter of the shank of a fed nail, an opening in the driving head to give access for nails serially into the passage therein adjacent the inner side of the magazine, the worm shaft extending beyond said magazine feed end to a position adjacent said opening, means for rotating the worm shaft one complete revolution for each operation of said device, a first flapper pivotally mounted on said driving head above said magazine, means for pivoting said first flapper back and forth relative said magazine whereby the lower edge thereof retains any nails in said magazine channel not engaged by said worm shaft while the worm shaft turns and releases any nails in said magazine channel when the worm shaft is not turning, and a second flapper pivotally mounted on said driving head above said magazine, means for pivoting said second flapper back and forth relative said magazine whereby its lower edge retains at least some of the nails in said magazine channel when the worm shaft is not turning and releases said nails when the worm shaft is turning.

7. A device as in claim 6 wherein both of said flappers are operated from said worm shaft.

8. A device as in claim 6 wherein the first flapper, upon commencement of rotation of the worm shaft, first engages the nails in the channel and thereafter the second flapper releases said nails.

9. A device as in claim 6 wherein, when the worm shaft is rotating and the first flapper has engaged the nails and the second flapper has disengaged them, the second flapper then first re-engages the nails before the first flapper disengages them.

10. A device as in claim 6 wherein upon rotation of the worm shaft, the first flapper engages the nails before the second flapper releases and, upon continuation of the rotation of the worm shaft, the second flapper re-engages the nails before the first flapper releases.

References Cited in the file of this patent

UNITED STATES PATENTS

| | | |
|---|---|---|
| 212,274 | Shepherd | Feb. 11, 1879 |
| 344,945 | Dayton | July 6, 1886 |
| 423,937 | Matzeliger | Mar. 25, 1890 |
| 1,171,685 | York | Feb. 15, 1916 |
| 1,250,047 | Swanson | Dec. 11, 1917 |
| 1,463,338 | Schroeder | July 31, 1923 |
| 2,546,354 | Bacon | Mar. 27, 1951 |